United States Patent [19]
Glover

[11] Patent Number: 4,545,019
[45] Date of Patent: Oct. 1, 1985

[54] AIRCRAFT IN-FLIGHT CENTER OF GRAVITY MEASURING SYSTEM

[75] Inventor: John H. Glover, Bothell, Wash.

[73] Assignee: Sundstrand Corporation, Rockford, Ill.

[21] Appl. No.: 389,803

[22] Filed: Jun. 18, 1982

[51] Int. Cl.$^4$ ............................................. G01M 1/12
[52] U.S. Cl. ................... 364/463; 235/61 T; 73/65
[58] Field of Search ............ 364/463, 428; 235/61 T; 73/65; 244/79, 3.2

[56] References Cited

U.S. PATENT DOCUMENTS

| | | | |
|---|---|---|---|
| 2,453,607 | 11/1948 | Wardale et al. | 235/61 T |
| 2,540,807 | 2/1951 | Berry | 235/61 T |
| 2,541,429 | 2/1951 | Mathes, Jr. et al. | 235/61 T |
| 2,735,291 | 2/1956 | Quinn | 235/61 T |
| 3,701,279 | 10/1972 | Harris et al. | 73/65 |
| 3,727,180 | 4/1973 | Lingel et al. | 73/65 |
| 3,948,096 | 4/1976 | Miller | 364/566 |
| 4,110,605 | 8/1978 | Bateman | 364/567 |

Primary Examiner—Errol A. Krass
Assistant Examiner—Thomas G. Black
Attorney, Agent, or Firm—Wood, Dalton, Phillips, Mason & Rowe

[57] ABSTRACT

In order to determine the location of the center of gravity of an aircraft in flight, an accelerometer is placed in the forward part of the aircraft and another is placed in the after part to produce signals representing the rotation of aircraft about an axis, preferably the yaw axis, through the aircraft center of gravity. The signals from the accelerometers are combined to produce a first signal having components that represent both motion of the aircraft and the location of the center of gravity along with a signal having a component representing the motion of the aircraft but substantially without a component representing the location of the center of gravity and these two signals are then combined to get a signal that represents the location of the aircraft center of gravity.

28 Claims, 2 Drawing Figures though the center of gravity of the aircraft, the signals from accelerometers are added to produce a summed signal and the signal from one accelerometer is subtracted from the other to produce a difference signal wherein the summed signal is multiplied by the difference signal to get a first combined signal and the difference signal is squared to get a second combined signal. A signal representing the location of the center of gravity within the aircraft is obtained by dividing the first combined signal by the second combined signal.

AIRCRAFT IN-FLIGHT CENTER OF GRAVITY MEASURING SYSTEM

BACKGROUND OF THE INVENTION

The invention relates to the field of systems for measuring the location of the center of gravity of an aircraft while in flight and in particular to such systems utilizing inertial components.

There are a number of reasons why it is considered desirable to be able to locate the exact center of gravity of an aircraft in flight including safety considerations. For example, the location of the center of gravity affects the control stability of the aircraft. In addition, the position of the center of gravity in the aircraft can be related to fuel consumption since the performance of the aircraft is affected by the attitude and the trim of the aircraft. In the case of a fixed wing aircraft, for instance, it is often possible to save fuel by moving the center of gravity aft which reduces the required stabilizer down load and hence drag.

An accurate knowledge of the center of gravity of the aircraft, in addition to permitting the crew to accurately assess the control and stability margins of the aircraft, will permit the crew or an automatic system to make the appropriate adjustments in the location of the center of gravity, by, for example, pumping fuel from one tank to another, in order to permit trimming of the aircraft for optimum performance.

One approach for determining in-flight center of gravity is to locate the center of gravity of the aircraft while it is on the ground either by calculating the center of gravity by utilizing the weight and location of passengers, cargo, and fuel loaded on the aircraft or by using an automatic weight and balance system such as the system disclosed in Bateman U.S. Pat. No. 4,312,042. Then the location and amount of fuel burned is audited to update the location of the center of gravity while in flight. However, these types of systems are subject to significant errors arising out of inaccuracies in fuel burn computations and shifts in passenger and cargo locations as well as errors that may be present in the initial measurement of the center of gravity on the ground.

SUMMARY OF THE INVENTION

It is therefore an object of the invention to provide an in-flight system for measuring the center of gravity of an aircraft utilizing inertial instruments to measure the rotation of the aircraft about an axis through the center of gravity of the aircraft.

It is an additional object of the invention to provide an in-flight system for measuring the center of gravity of an aircraft using two accelerometers located fore and aft of the center of gravity wherein the signals of the accelerometers are combined to produce one signal that includes components representing both the location of the center of gravity and rotation of the aircraft about the center of gravity and another signal containing just the acceleration components. These two signals are combined in a manner that substantially eliminates the rotational components thereby providing a signal representing the location of the center of gravity.

It is a further object of the invention to provide an in-flight system for measuring the center of gravity of an aircraft that includes a pair of accelerometers one of which is located forward of the aircraft center of gravity and the other aft of the center of gravity such that the sensitive axis of each accelerometer is aligned so as to produce a signal representing the rotation of the aircraft about an axis, preferably the yaw axis, through the center of gravity of the aircraft. The signals from accelerometers are added to produce a summed signal and the signal from one accelerometer is subtracted from the other to produce a difference signal wherein the summed signal is multiplied by the difference signal to get a first combined signal and the difference signal is squared to get a second combined signal. A signal representing the location of the center of gravity within the aircraft is obtained by dividing the first combined signal by the second combined signal.

DETAILED DESCRIPTION OF THE INVENTION

Figure 1:
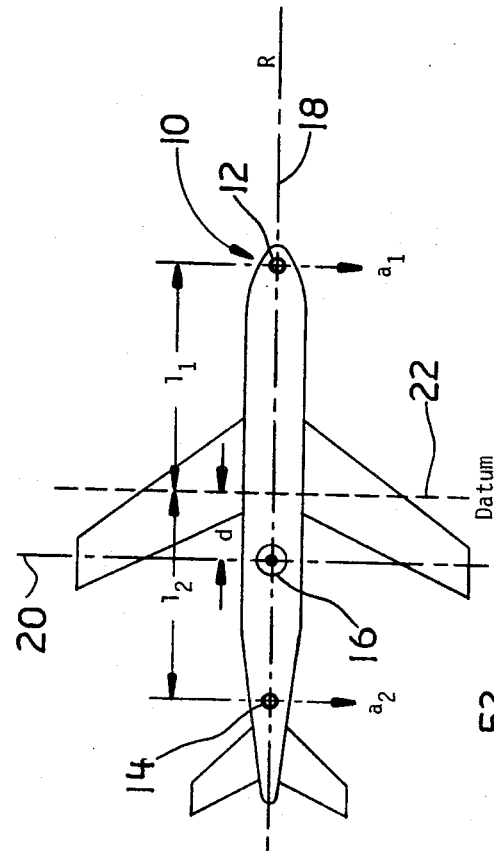
FIG. 1 is a top view of an aircraft illustrating the location of the center of gravity with respect to the pitch, roll and yaw axis of the aircraft.

As shown in the top view of an aircraft 10, provided in FIG. 1, the inertial sensors for an in-flight center of gravity measuring system comprise a first accelerometer 12 secured preferably as far forward in the aircraft as possible and a second accelerometer 14 secured preferably as far aft as possible in the aircraft. The center of gravity of the aircraft is indicated in FIG. 1 by the circle 16 through which the roll axis indicated by line 18 and the pitch axis of the aircraft indicated by line 20 intersect. The yaw axis which is perpendicular to both the roll axis 18 and the pitch axis 20 also intersects the center of gravity 16.

Figure 2:
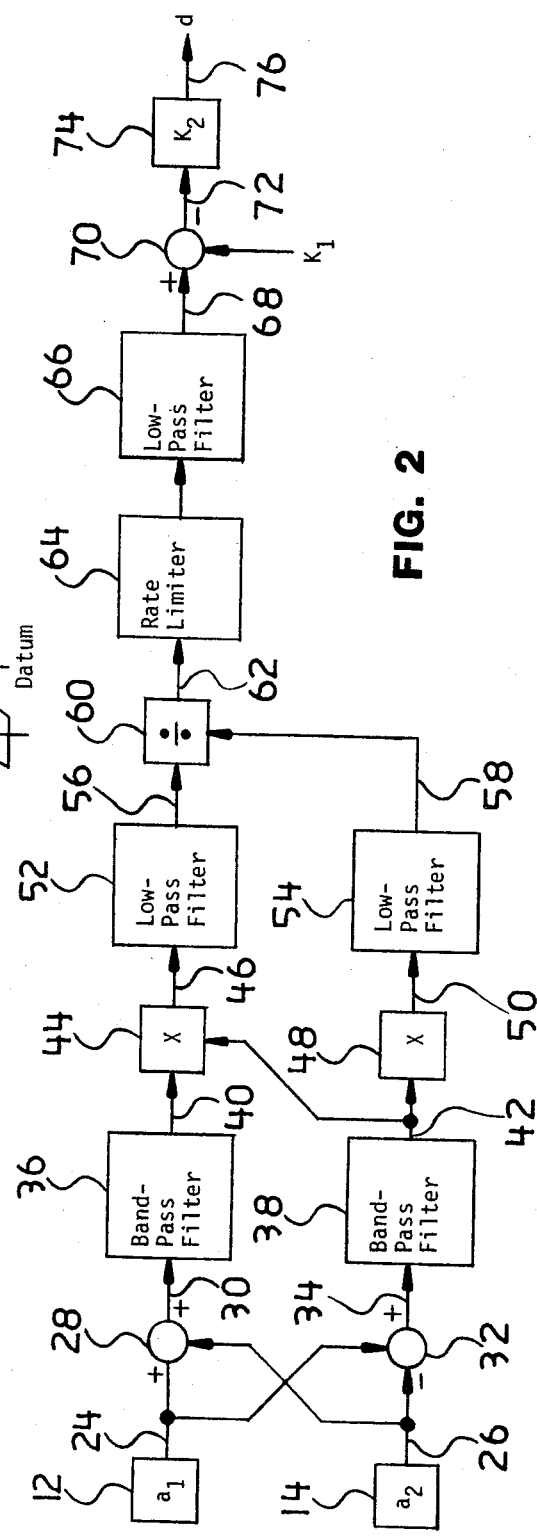
FIG. 2 is a block diagram of a circuit for generating a signal representing the location of the aircraft center of gravity.

In the preferred embodiment of the invention as illustrated in FIGS. 1 and 2, the sensitive axis of each of the accelerometers 12 and 14 are aligned in a parallel direction so as to detect rotational motion of the aircraft 10 about the yaw axis in the plane defined by the pitch axis 20 and the roll axis 18. The alignment of the sensitive axis of the accelerometers 12 and 14 in the plane perpendicular to the yaw axis is considered to be the preferable arrangement since it tends to minimize the effects of gravity on the output signals of the accelerometers.

In calculating the location of the center of gravity 16 in the aircraft 10, an arbitrary datum, as indicated by the dashed line 22 in FIG. 1, is used as a reference from which the distance d of the center of gravity is measured. Also as shown in FIG. 1, the distance of the first accelerometer 12 along the roll or longitudinal axis 18 of the aircraft 10 to the datum 22 is indicated by $l_1$ and the distance of the second accelerometer 14 to the datum 22 is indicated by $l_2$.

In FIG. 2 of the drawings is provided, in block diagram form, an illustration of a system for calculating from the output signal $A_1$ of the first accelerometer 12 and the output signal $A_2$ of the second accelerometer 14 a signal representing d which serves to locate the position of the center of gravity 16. The acceleration signals $A_1$ and $A_2$ are first applied over lines 24 and 26 to a first summing circuit 28 to produce a summed signal on line 30 that is equal to $A_1 + A_2$. These signals are also applied over lines 24 and 26 to a subtracting circuit 32 to produce a difference signal on line 34 equal to $A_1 - A_2$. A pair of band-pass filters 36 and 38 receive the signals over lines 30 and 34 respectively. Both of the band-pass filters 36 and 38 are tuned to the "dutch roll" frequency of the aircraft which is the natural frequency with which the aircraft tends to rotate about the yaw and roll axis.

Outputs of both the band-pass filters 36 and 38 on lines 40 and 42 respectively are applied to a multiplier circuit 44 resulting in an output on line 46 that is approximately equal to $(A_1+A_2)(A_1-A_2)$. At the same time the output of the band-pass filter 38 is applied by means of line 42 to a squaring circuit 48 resulting in an output on line 50 that represents the quantity $(A_1-A_1)^2$.

Connected to lines 46 and 50 are a pair of lowpass filters 52 and 54 respectively that function essentially as phase detectOrs and in a typical aircraft application might have a low-pass frequency on the order of 1 radian per second with a 0.8 damping factor. The output of the low pass filter 52 on line 56 would represent the relative phase angle between $A_1+A_2$ and $A_1-A_2$ and as such contains a component that represents d as well as a component that is dependent on the amplitude of the $A_1$ and $A_2$ signals that results from rotation of the aircraft about the yaw axis. On the other hand the output of the low pass filter 54 on line 58 is substantially independent of d but is dependent on the amplitude of the $A_1$ and $A_2$ signals.

In order to get a signal that represents d the signals on lines 56 and 58 are input to a divider circuit 60 which substantially removes the effects of the amplitudes of $a_1$ and $a_2$ by dividing the signal on line 56 by the signal on line 58. The resulting output on line 62 is applied to a rate limiter circuit 64 and subsequently to a low-pass filter 66. In the event the values of $l_1$ and $l_2$ are not equal it may be desirable to scale the output of the low-pass filter 66 on line 68 by inputting a bias signal $K_1$ by means of a summing circuit 70 to the signal on line 68 and to multiply the output on line 72 by a gain factor of $K_2$ in an amplifier circuit 74. The output on line 76 will then provide an accurate measure of d. Appropriate values of $K_1$ and $K_2$ are given by the following relations:

$$K_1 = \frac{l_1 - l_2}{l_1 + l_2} \quad (1)$$

$$K_2 = \frac{l_1 - l_1}{2} \quad (2)$$

I claim:

1. An aircraft in flight center of gravity measuring system comprising:
    a pair of inertial sensors secured to the aircraft, each inertial sensor having a sensitive axis which is aligned so as to produce a signal representing the rotation of the aircraft about a predetermined axis through the aircraft center of gravity; and
    signal processing means connected to said inertial sensors including means for developing a signal from the output of the inertial sensors having components representing aircraft rotation about the predetermined axis and the location of the center of gravity and means coupled to the developing means for canceling the component representing aircraft rotation to generate a signal representing the location of the center of gravity of the aircraft while the aircraft is in flight.

2. The system of claim 1 wherein said inertial sensors include at least two accelerometers that generate signals representing rotation of the aircraft about said predetermined axis.

3. An aircraft in flight center of gravity measuring system comprising:
    a plurality of inertial sensors secured to the aircraft which generate signals representing rotation of the aircraft about a predetermined axis through the aircraft center of gravity, wherein the inertial sensors include at least two accelerometers that generate signals representing rotation of the aircraft about the predetermined axis; and
    signal processing means connected to the inertial sensors for generating from the inertial sensors a signal representing the location of the center of gravity of the aircraft while the aircraft is in flight comprising means for generating a first signal including a component representing the location of the center of gravity and a component representing aircraft rotation about the predetermined axis, means for generating a second signal substantially without a component representing the rotation of the aircraft and means for combining the first and second signals to generate the signal representing the location of the center of gravity of the aircraft.

4. An aircraft in flight center of gravity measuring system comprising:
    a plurality of inertial sensors secured to the aircraft wherein the inertial sensors generate signals representing rotation of the aircraft about a predetermined axis through the aircraft center of gravity wherein the predetermined axis is the yaw axis of the aircraft; and
    signal processing means connected to the inertial sensors for generating from the inertial sensors a signal representing the location of the center of gravity of the aircraft while the aircraft is in flight.

5. An aircraft in-flight center of gravity measuring system comprising:
    first acceleration measuring means secured to said aircraft forward of the aircraft center of gravity for generating a first acceleration signal representing rotation of the aircraft about a predetermined axis through the aircraft center of gravity;
    second acceleration measuring means secured to said aircraft aft of the aircraft center of gravity for generating a second acceleration signal representing rotation of the aircraft about said predetermined axis;
    first combining means connected to said first and said second acceleration measuring means for combining said first acceleration signal with said second acceleration signal to generate a first combined signal having a component representing the location of the aircraft center of gravity and a component representing rotation of the aircraft;
    second combining means connected to said first and said second acceleration means for combining said first acceleration signal with said second acceleration signal to generate a second combined signal having a component representing rotation of the aircraft but substantially without a component representing the location of the aircraft center of gravity;
    third combining means connected to said first and said second combining means for combining said first and said second combined signals to generate a third combined signal having component representing the location of the center of gravity but substantially without components representing rotation of the aircraft; and center of gravity signal means connected to said third combining means for generating from said third combined signal a center of gravity signal representing the location of the aircraft center of gravity.

6. The system of claim 5 wherein said first combining means includes summing means to sum said first acceleration signal with said second acceleration signal to generate a summed signal.

7. The system of claim 7 wherein said second combing means included subtracting means for subtracting one of said acceleration signals from the other of said acceleration signals to generate a difference signal.

8. The system of claim 8 wherein said first combining means is connected to said second combining means and includes means for multiplying said summed signal with said difference signal to generate said first combined signal.

9. The system of claim 8 wherein said second combining means includes means for squaring said difference signal to generate said second combined signal.

10. The system of claim 6 wherein said third combining means includes means for dividing said first combined signal by said second combined signal.

11. The system of claim 6 wherein said first combining means includes a band-pass filter having a band-pass frequency substantially equal to the natural frequency of rotation of the aircraft about said predetermined axis.

12. The system of claim 5 wherein said second combining means includes a band-pass filter having a band-pass frequency substantially equal to the natural frequency of rotation of the aircraft about said predetermined axis.

13. The system of claim 5 wherein said center of gravity signal means includes scaling means for scaling said center of gravity signal.

14. The system of claim 13 wherein said scaling means includes means for adding a bias signal to said third combined signal.

15. The system of claim 14 wherein said scaling means includes means for multiplying the combination of said bias signal and said third combined signal by a predetermined gain factor.

16. The system of claim 15 wherein the values of said bias signal and said predetermined gain factor are selected as a function of the relative locations of said first and said second acceleration measuring means from a predetermined datum in the aircraft.

17. The system of claim 5 wherein said center of gravity means includes rate limiter means for limiting the rate of increase and decrease of said third combined signal.

18. The system of claim 17 wherein said center of gravity means includes a low-pass filter operatively connected to said rate limiter means.

19. The system of claims 5, 6, 7, 8, 9, 10, 11, 12, 13, 14, 15, 16, 17, or 18 wherein said predetermined axis is the yaw axis of the aircraft.

20. An aircraft in-flight center of gravity measuring system comprising:

a first accelerometer secured to the aircraft forward of the aircraft center of gravity with the sensitive axis of said first accelerometer aligned such that said first accelerometer will generate a first acceleration signal that represents rotation of the aircraft about a predetermined axis of the aircraft;

a second accelerometer secured to the aircraft aft of the aircraft center of gravity with the sensitive axis of said second accelerometer aligned such that said second accelerometer generates a second acceleration signal representing the rotation of the aircraft about said predetermined axis of the aircraft;

summing means connected to said first and said second accelerometers for adding said first accelerometer signal to said second acceleration signal to produce a summed signal;

subtracting means connected to said first and second accelerometers for subtracting one of said accelerometer signals from the other to generate a difference signal;

multiplication means connected to said summing means and said subtracting means for multiplying said summed signal with said difference signal to generate a first combined signal;

squaring means connected to said subtracting means for squaring said difference signal to generate a second combined signal;

dividing means connected to said multiplication means and said squaring means for dividing said first combined signal by said second combined signal to generate a third combination signal; and center of gravity signal means connected to said dividing means for generating from said third combination signal a center of gravity signal representing the location of the aircraft center of gravity.

21. The system of claim 20 additionally including a first band-pass filter connected between said first accelerometer and said summing means and a second band-pass filter operatively connected between said second accelerometer and said subtracting means.

22. The system of claim 21 wherein the band-pass frequency of said first and said second band-pass filter is substantially equal to the natural frequency of rotation of the aircraft about the aircraft center of gravity.

23. The system of claim 20 additionally including a first low-pass filter connected between said multiplication means and said dividing means and a second low-pass filter operatively connected between said squaring means and said dividing means.

24. The system of claim 20 additionally including a low-pass filter connected between said dividing means and said center of gravity means.

25. The system of claim 20 additionally including a source of bias signal connected to said center of gravity means.

26. The system of claim 20 wherein said center of gravity signal means includes means for scaling said center of gravity signal in relation to the relative location of said first and said second accelerometer within the aircraft.

27. The system of claim 20 additionally including a rate limiter connected between said divider means and said center of gravity means.

28. The system of claim 20, 21, 23, 24, 25, 22, 27, or 26 wherein said predetermined axis is the yaw axis of the aircraft.

* * * * *

UNITED STATES PATENT AND TRADEMARK OFFICE
CERTIFICATE OF CORRECTION

PATENT NO. : 4,545,019

DATED : October 1, 1985

INVENTOR(S) : John H. Glover

It is certified that error appears in the above—identified patent and that said Letters Patent are hereby corrected as shown below:

Column 3, line 46, change equation (2) "$L_1 - L_1$" to -- $L_1 - L_2$. --

Signed and Sealed this

Twelfth Day of August 1986

[SEAL]

Attest:

DONALD J. QUIGG

Attesting Officer

Commissioner of Patents and Trademarks